Patented May 10, 1927.

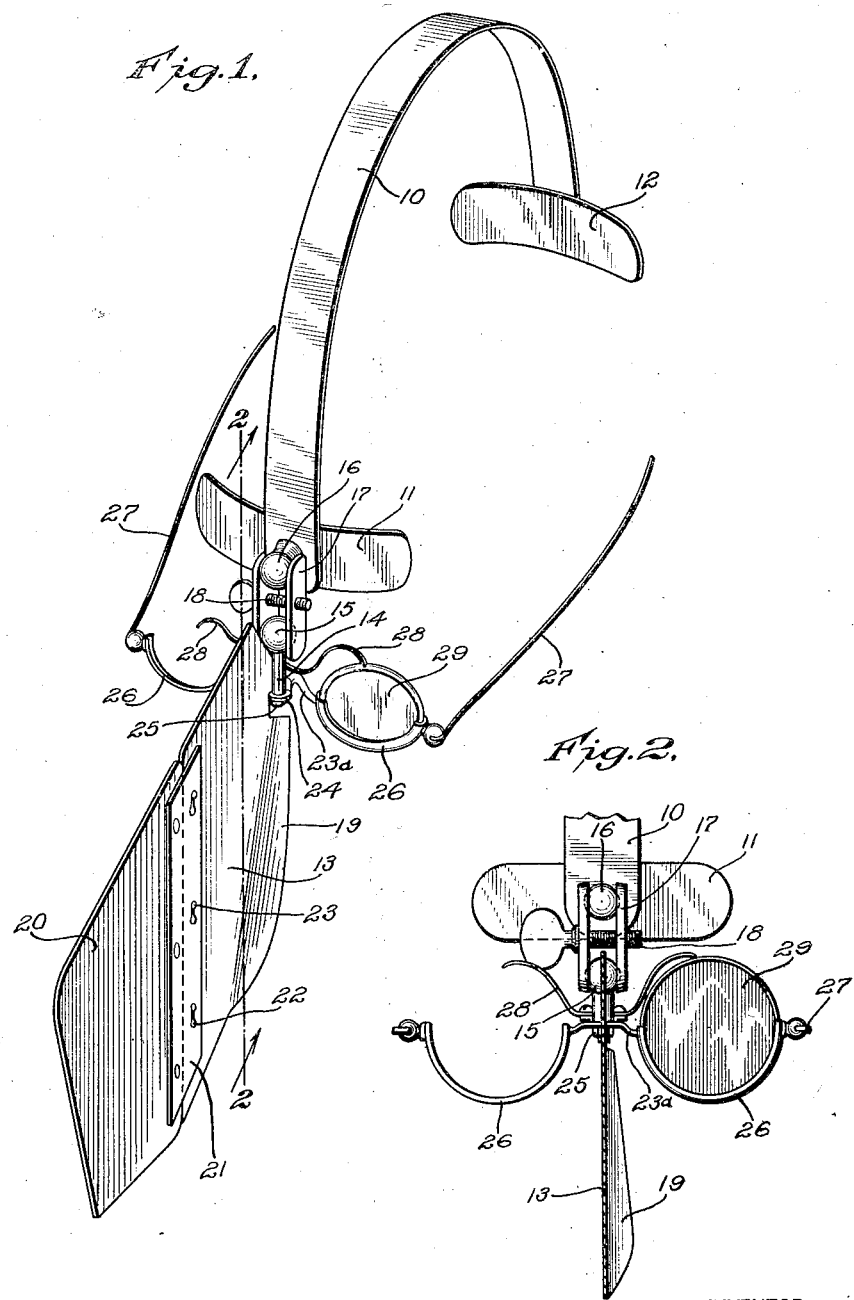

1,628,551

UNITED STATES PATENT OFFICE.

BENJAMIN LAKE NOYES, OF STONINGTON, MAINE.

ANTIGLARE DEVICE.

Application filed March 29, 1926. Serial No. 98,359.

The present invention is concerned with the provision of a device for preventing the driver of an automobile from being blinded by the glare of the headlights of approaching cars. An object of the invention is to provide an antiglare device of this character which may be worn by the driver when driving at night, which will eliminate the necessity for using any of the various types of windshield glare preventers commonly employed, and which obviates and prevents the necessity of special deflecting lenses in auto head lights.

A further object is to provide an antiglare device of this character of simple, practical construction, which will be rugged, durable and efficient in use, which may be readily adjusted to fit the driver's head and face, and which will be extremely comfortable and convenient in use, and capable of ready application or removal.

More specifically the invention contemplates the provision of an antiglare device in which either a head band or a pair of spectacles carries a forwardly presented antiglare plate for shading the driver's right eye from the glare of approaching cars. In the event that the driver is unable to conveniently squint the left eye, the device may be supplemented by a spectacle frame in which is mounted a red lens to protect the left eye. In some instances the spectacle frame may be discarded, but where it is used I prefer to have the lens for the left eye readily removable, and detachably held, so that various types of special lenses may be fitted into the frame in order to suit the requirements of the individual driver.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a perspective view of an antiglare device embodying the present invention.

Fig. 2 is a transverse sectional view therethrough on the line 2—2 of Fig. 1.

In the drawings I have used the reference character 10 to designate a head band of conventional construction, including an intermediate portion of spring material, an anterior rest plate 11 and a posterior rest plate 12. Instead of this head band I may use various other forms of head encircling elements of either conventional or convenient construction, the present invention being more particularly concerned with the antiglare device than with the head band which mounts it.

Supported in any suitable manner upon the head band is a forwardly presented antiglare plate 13 preferably of thin aluminum covered with varnish lamp black. The rear upper corner of the plate is rigid with a stud member 14 mounting a ball 15. A similar ball 16 extends forwardly from the head band 10, and the balls are connected by a pair of plates 17 mounting a clamping screw 18 to effect a double ball and socket connection. Thus, free movement of the plates relative to the balls 16 is had, and also free movement of the antiglare plate relative to the plates 18.

It will be noted that the rear edge of the glare plate is bent laterally at 19 to conform to the shape of a wearer's nose. In practice this rear edge will be slightly bent, and the material of the plate is so readily bendable that the wearer may conveniently manually bend the plate edge until it snugly fits his own nose.

In some instances it will be desirable to provide a forward extension 20 for the glare plate 13. Various expedients might be resorted to in this connection. For instance the glare plate 13 might be channelled to receive the rear edge of the glare plate 20. I have shown one convenient form of detachable connection which includes an attaching strip 21 mounted at the rear edge of the plate 20 and formed with keyhole slots 22 receiving studs 23 on the plate 13.

The construction as thus far described, either with or without the glare plate 20 may be used independently of the spectacle construction which I am about to describe. Also, the spectacles may be used to support the glare plate, and the head band discarded. The use of the spectacle is more particularly intended in the case of drivers who ordinarily wear glasses and in the case of drivers who have difficulty in closing one eye at a time. A red lens may also be mounted in the spectacle frame.

The construction of the spectacles is also subject to a wide variety of variations, but I have shown one convenient method of mounting them, in which the bridge 23ª is formed with a forwardly projecting eye 24, pivotally mounted by a nut 25 on a threaded extension of stud 14. Pairs of channelled half rims 26 are carried by the bridge 23ª, and the temples 27 secured to the outer end of the rims in any appropriate manner. Mounted on the bridge are a pair of spring fingers 28 extending over the half frames 26, and adapted to engage a single left red lens 29, or other combinations of lenses may be detachably held in the frame.

If the driver is compelled to wear spectacles, his own spectacle lenses may be conveniently mounted in the frames 26. If he does not wear glasses, but requires the red lens 29, the right hand frame 26 will not interfere with proper vision through the right eye. In many cases as above noted, the spectacles may be entirely dispensed with. In the majority of cases the head band will be discarded and the glare plate will be used with and supported by the spectacles.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. An antiglare device of the class described including a glare plate adapted to project forwardly between the eyes of a wearer, means for supporting said plate upon a wearer's head, and a universal connection between the plate and its supporting means.

2. An antiglare device of the class described including a glare plate adapted to project forwardly in a vertical plane between the eyes of a wearer, a head band for supporting said plate upon a wearer's head, and a universal connection between the plate and head band.

3. The combination with a support attachable to the head of a wearer, of a glare plate adapted to project forwardly in a vertical plane between the eyes of the wearer, said glare plate being carried by the supporting means, and adapted to rest on its rear end against the wearer's nose, the rear edge of the glare plate being laterally bent to conform to the shape of the wearer's nose.

4. The combination with a head band, of a glare plate adapted to project forwardly in a substantially vertical plane between the eyes of the wearer of the head band, said glare plate being supported by the band and adapted to rest on its rear end against the wearer's nose, the glare plate comprising a plurality of plate sections detachably connected together at their edges and cooperating to extend the distance to which the plate projects forwardly of the wearer's nose.

5. The combination with a spectacle frame, a glare plate attached thereto, and adapted to project forwardly in a vertical plane between the eyes of the wearer of the spectacle frame, said glare plate being supported by the frame and adapted to rest at its rear end against the wearer's nose, said glare plate including a forward extension adapted to be detachably engaged with the body of the plate to extend the plate.

6. The combination with a head band having a ball rigid therewith, of a glare plate adapted to project forwardly from a wearer's face, said glare plate including at its rear end a ball, and a pair of clamping plates engaged with both of said balls to effect a double universal connection between the glare plate and its supporting head band.

7. The combination with a head band, of a glare plate supported by and universally connected to the head band, and a pair of spectacle frames detachably connected to the glare plate.

8. An antiglare device of the class described including a pair of spectacle frames, a glare plate adapted to project forwardly in a vertical plane between the eyes of a wearer of the frames, and a detachable connection between the glare plate and the bridge piece of the spectacle frame.

BENJAMIN LAKE NOYES.